United States Patent [19]
Kugimiya et al.

[11] Patent Number: 5,023,786
[45] Date of Patent: Jun. 11, 1991

[54] LANGUAGE TRANSLATOR WHICH RECOGNIZES AND INDICATES PREPOSITIONAL OR INDEFINITE PHRASES AND RELATIVE CLAUSES

[75] Inventors: Shuzo Kugimiya; Hitoshi Suzuki; Yoji Fukumoshi; Ichiko Sata, all of Nara; Tokuyuki Hirai, Yamatokoriyama; Yumi Nishida, Nara, all of Japan

[73] Assignee: Sharp Kabushiki Kaisha, Osaka, Japan

[21] Appl. No.: 241,252

[22] Filed: Sep. 7, 1988

[30] Foreign Application Priority Data

Sep. 8, 1987 [JP] Japan .............................. 62-224842

[51] Int. Cl.[5] .............................................. G06F 15/38
[52] U.S. Cl. .................................... 364/419; 364/900; 364/920.4
[58] Field of Search ................ 364/419, 900 MS File, 364/200 MS File

[56] References Cited

U.S. PATENT DOCUMENTS 4,597,055 6/1986 Hashimoto et al. ................ 364/900
4,613,309 9/1986 McCloskey ......................... 434/170
4,706,212 11/1987 Toma ................................. 364/900
4,774,666 9/1988 Miyao et al. ........................ 364/419
4,787,038 11/1988 Doi et al. ........................... 364/419
4,814,987 3/1989 Miyao et al. ........................ 364/419
4,821,230 4/1989 Kumano et al. ................ 364/900 X

FOREIGN PATENT DOCUMENTS 0244871 11/1987 European Pat. Off. .
0215282 10/1985 Japan .

*Primary Examiner*—Clark A. Jablon

[57] ABSTRACT

A translating apparatus including a morphological analysis portion for dividing an inputted sentence of a source language into a string of morphemes; a syntactic analysis portion for analyzing a construction of the string of the morphemes; a conversion portion for converting the inputted sentence into a target language; a translation generation portion for generating a translated sentence of the target language; a syntactic decision device which decides whether or not a prepositional or indefinite phrase for modifying a verb or a relative clause of nonrestrictive use accompanied by a comma located immediately before the phrase exists in the string of the morphemes; and a symbol generating device which generates in the translated sentence, first and second symbols indicative, respectively, of a start position and an end position of the relative clause or the prepositional or indefinite phrase found by the syntactic decision device such that a translation of the relative clause or the prepositional or indefinite phrase is inserted between the first and second symbols.

10 Claims, 6 Drawing Sheets

*Fig. 7*
*PRIOR ART*
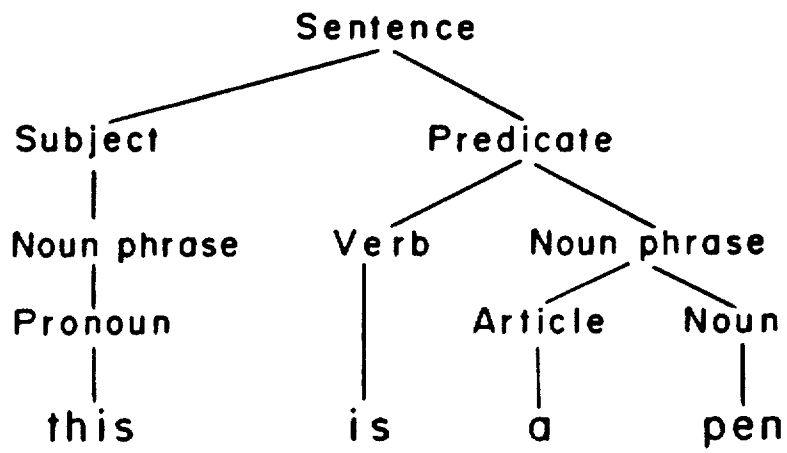
*Fig. 8*
*PRIOR ART*
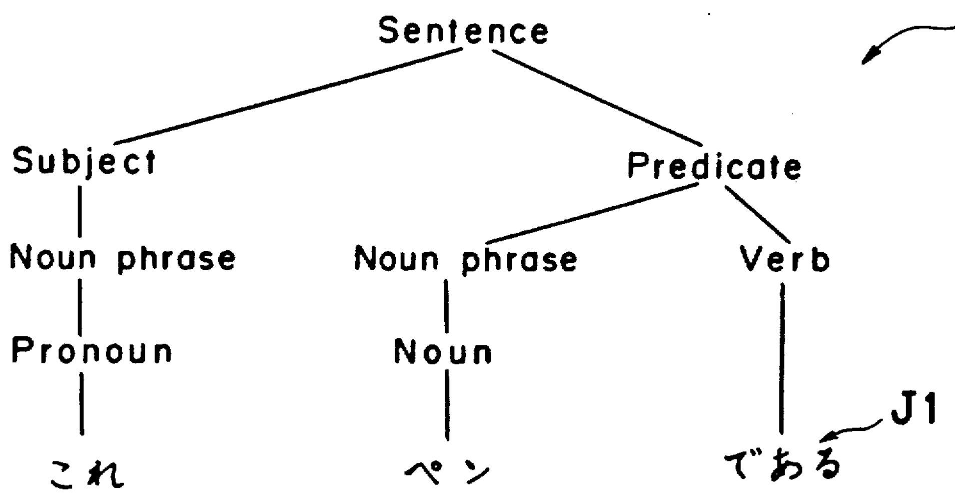
*Fig. 9*
*PRIOR ART*
J2 E
これはペンである。

Fig. 11

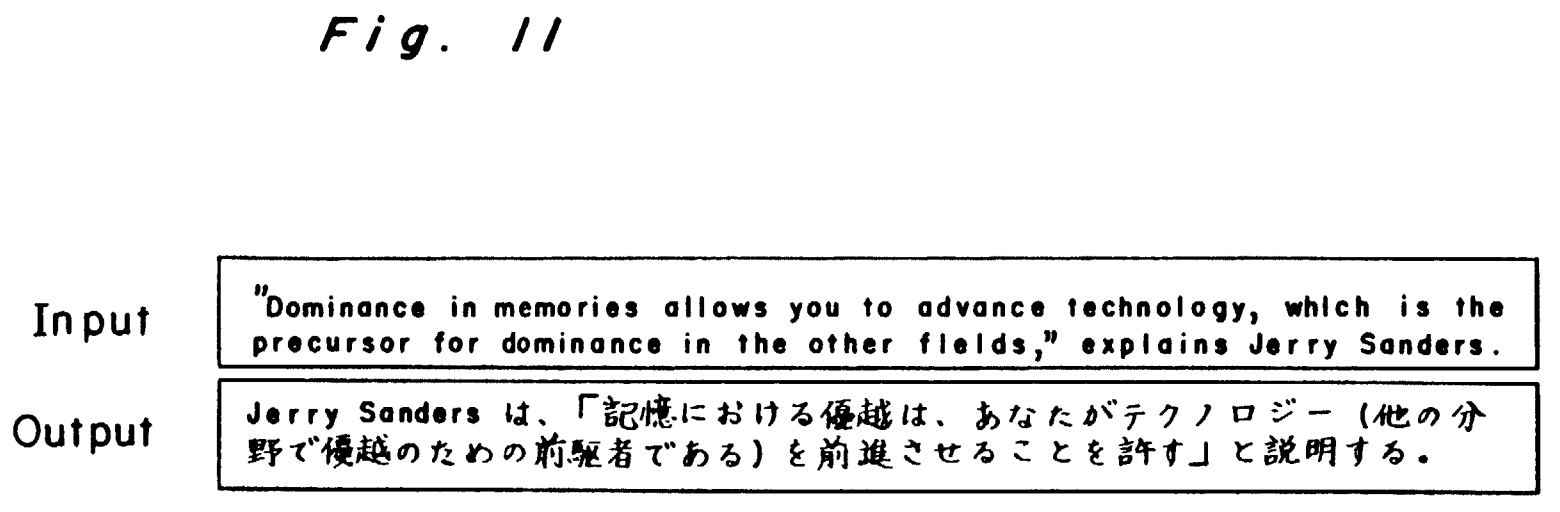

Input

"Dominance in memories allows you to advance technology, which is the precursor for dominance in the other fields," explains Jerry Sanders.

Output

Jerry Sanders は、「記憶における優越は、あなたがテクノロジー（他の分野で優越のための前駆者である）を前進させることを許す」と説明する。

LANGUAGE TRANSLATOR WHICH RECOGNIZES AND INDICATES PREPOSITIONAL OR INDEFINITE PHRASES AND RELATIVE CLAUSES

BACKGROUND OF THE INVENTION

The present invention relates to a translating apparatus which facilitates understanding of a whole translated sentence.

Conventionally, in translating apparatuses, it has been so arranged that a source language inputted from a keyboard is inputted to a translation module under control of a main CPU such that this inputted source language is translated into a target language by the translation module by using a dictionary, grammatical rules and tree structure conversion rules, which are stored in a memory. At the time of translation, if a relative clause led by a relative of nonrestrictive use exists in the source language, the relative clause is generated in the translated sentence so as to at all times modify an antecedent of the relative at a position preceding the antecedent. Meanwhile, a prepositional or indefinite phrase for modifying a verb, which is accompanied by a comma located immediately before the phrase, is generated in the translated sentence so as to modify a declinable word in the translated sentence at all times.

However, the known translating apparatuses have such a drawback that in the case where the relarive clause led by the relative of nonrestrictive use or the prepositional or indefinite phrase for modifying a verb is long, the antecedent or the declinable word is far spaced rearwards of the relative or the prepositional or indefinite phrase and thus, it becomes difficult to understand the translated sentence as a whole.

SUMMARY OF THE INVENTION

Accordingly, an essential object of the present invention is to provide a translating apparatus in which a relative clause of nonrestrictive use and a prepositional or indefinite phrase for modifying a verb accompanied by a comma located immediately before the phrase are independently generated in a symbol such as parentheses "(11)" so as to be clarified in a translated sentence such that understanding of the translated sentence as a whole is facilitated.

In order to accomplish this object of the present invention, a translating apparatus embodying the present invention comprises: a morphological analysis portion which divides an inputted sentence of a source language into a string of morphemes by using a dictionary; a syntactic analysis portion which analyzes a construction of the string of the morphemes by using the dictionary and grammatical rules; a conversion portion which converts the construction of the string of the morphemes into a construction of a target language; a translation generation portion which generates a translated sentence of the target language in accordance with the construction of the target language; a syntactic decision means which decides whether or not a relative clause of nonrestrictive use or a prepositional or indefinite phrase for modifying a verb accompanied by a comma located immediately before the prepositional or indefinite phrase exists in the construction of the string of the morphemes; and a symbol generating means which generates in the translated sentence, first and second symbols indicative, respectively, of a start position and an end position of the relative clause or the prepositional or indefinite phrase found by said syntactic decision means, wherein a translation of the relative clause or the prepositional or indefinite phrase is generated by said translation generation portion so as to be inserted between the first and second symbols.

In the translating apparatus of the present invention, when the sentence of the source language has been inputted to the morphological analysis portion, this sentence is divided into the string of the morphemes by the morphological analysis portion and further, the construction of the string of the morphemes is analyzed by the syntactic analysis portion. Then, the syntactic decision means decides whether or not the relative clause of nonrestrictive use or the prepositional or indefinite phrase for modifying a verb accompanied by a comma located immediately before the phrase exists in the construction of the string of the morphemes. As a result, if the syntactic decision means has decided that the relative clause or the prepositional or indefinite phrase exists in the construction of the string of the morphemes, the translation generation portion generates the translation of the relative clause or the prepositional or indefinite phrase so as to insert the translation between the first and second symbols generated by the symbol generating means, which are indicative of the start position and the end position of the relative clause or the prepositional or indefinite phrase, respectively.

Therefore, in accordance with the present invention, the relative clause of nonrestrictive use or the prepositional or indefinite phrase for modifying a verb accompanied by a comma located immediately before the phrase is inserted between the first and second symbols so as to be clarified in the translated sentence.

BRIEF DESCRIPTION OF THE DRAWINGS

The objects and features of the present invention will become apparent from the following description taken in conjunction with the preferred embodiment thereof with reference to the accompanying drawings which are given by way of illustration only, and thus are not limitative of the present invention, and wherein:

FIGS. 5 to 9 are views showing contents of buffers of the translation module of FIG. 3, respectively;

FIG. 11 is a view showing one example of an inputted original sentence and an outputted translated sentence in the translating apparatus of FIG. 1.

Before the description of the present invention proceeds, it is to be noted that like parts are designated by like reference numerals throughout the accompanying drawings.

DETAILED DESCRIPTION OF THE INVENTION

Figure 1:
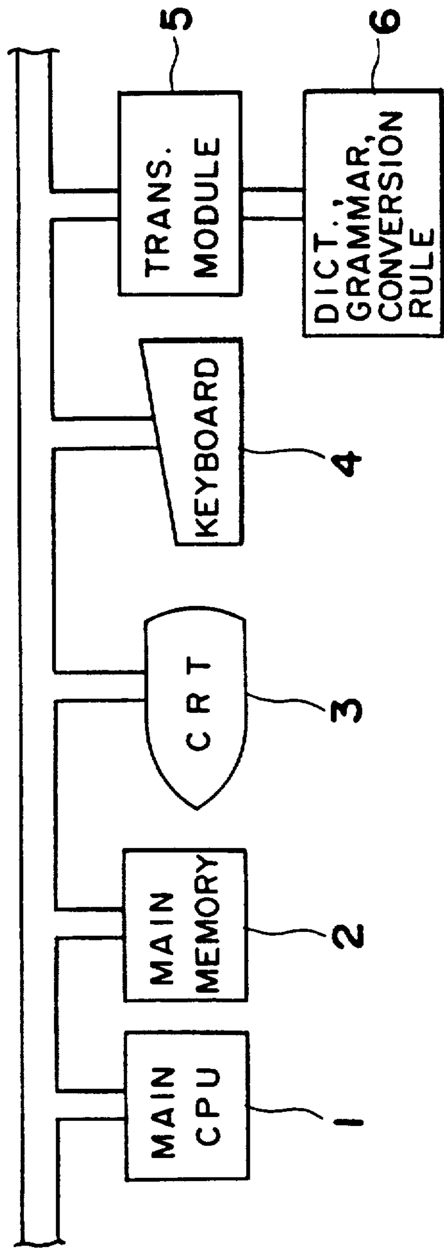
FIG. 1 is a block diagram of a translating apparatus according to one embodiment of the present invention.

Referring now to the drawings, there is shown in FIG. 1, a translating apparatus according to one embodiment of the present invention. The translating apparatus includes a main CPU (central processing unit) 1, a main memory 2, a CRT (cathode ray tube) 3, a keyboard 4, a translation module 5 and a memory 6 for storing a dictionary, grammatical rules, tree structure conversion rules, etc. for translation. The translation module 5 translates an inputted source language into a target language so as to output the target language. Namely. the source language inputted from the keyboard 4 is fed to the translation module 5 under control of the main CPU 1. As will be described in detail later, the translation module 5 translates the inputted source language into the target language by using the dictionary, the grammatical rules, the tree structure conversion rules, etc. stored in the memory 6. The translated result is not only temporarily stored in the main memory 2 but displayed by the CRT 3.

Figure 2:
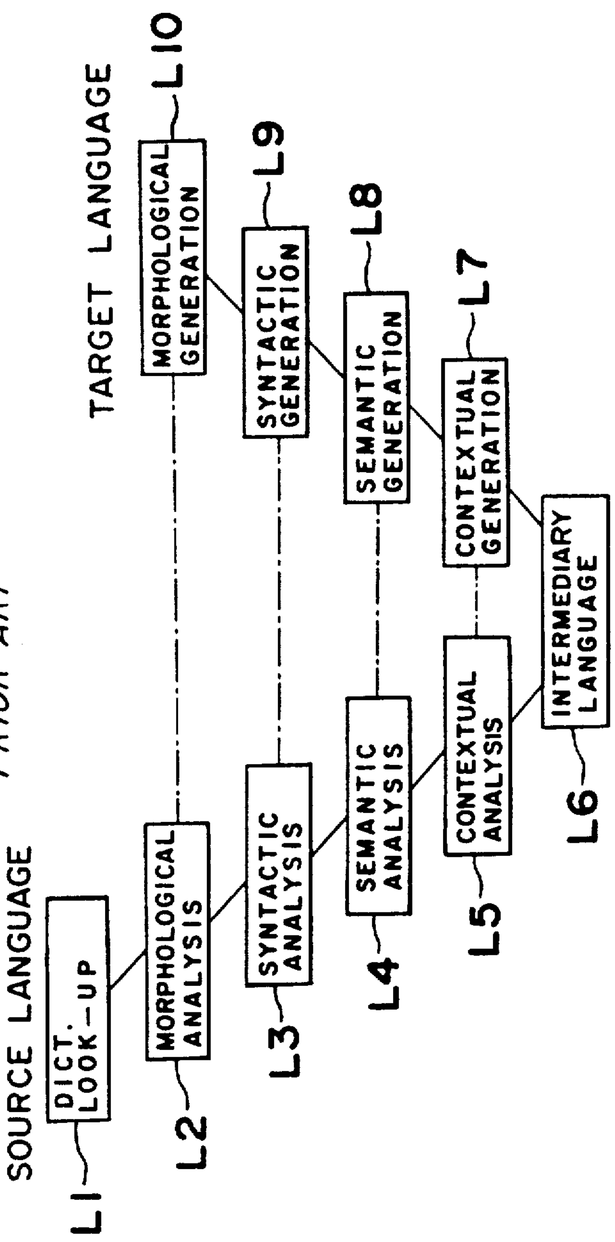
FIG. 2 is a view explanatory of translation levels in automatic translation of the translating apparatus of FIG. 1.

Generally, automatic translation performed by the translation module 5 includes analysis levels shown in FIG. 2. When the source language is inputted at an upper left portion of FIG. 2, analyses are sequentially performed in the order of dictionary look-up of level L1, morphological analysis of level L2, syntactic analysis of level L3, semantic analysis of level L4 and contextual analysis of level L5.

Machine translation is roughly classified into two types according to these analysis levels. One is a pivot type and the other is a transfer type. In the pivot type machine translation, analyses are performed up to a concept of level L6 (referred to as an "intermediary language"), which belongs to neither the source language nor the target language. Then, the intermediary language is sequentially subjected to contextual generation of level L7, semantic generation of level L8, syntactic generation of level L9 and morphological generation of level L10 so as to be generated into the target language. Meanwhile, in the transfer type machine translation, analyses are performed up to any one of morphological analysis of level L2, syntactic analysis of level L3, semantic analysis of level L4 and contextual analysis of level L5 such that an internal construction of the source language is obtained. Subsequently, this obtained internal construction of the source language is converted into an internal construction of the target language having a level identical with that of the internal construction of the source language such that the target language s generated.

Hereinbelow, each analysis of the translating apparatus is described.

(1) Dictionary look-up and morphological analysis

In dictionary look-up and morphological analysis, the dictionary of the memory 6 is assessed up and the inputted sentence is divided into a string of morphemes (words). Furthermore, grammatical data such as a part of speech of each of the words and a translation of each of the words are obtained and tense, person, number, etc. of each of the words are analyzed.

(2) Syntactic analysis

In syntactic analysis, a construction of the sentence (structural analysis tree) such as modificatory relations among the words is determined as will be described later.

(3) Semantic analysis

In semantic analysis, a correct meaning of the sentence is distinguished from incorrect meanings of the sentence on the basis of a plurality of results of syntactic analysis.

(4) Contextual analysis

In contextual analysis, a subject matter of the sentence is recognized and deleted portions are filled up and obscure portions are removed.

Figure 3:
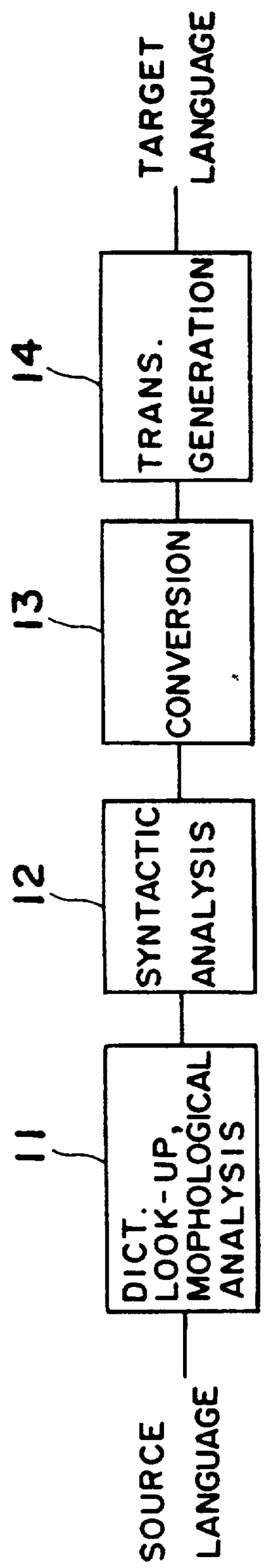
FIG. 3 is a view showing a construction of a translation module of the translating apparatus of FIG. 1.

It is to be noted that the translation module 5 employed in the present invention performs analyses up to at least syntactic analysis of level L3. Namely, as shown in FIG. 3, the translation module 5 of this embodiment includes a dictionary look-up and morphological analysis portion 11, a syntactic analysis portion 12, a conversion portion 13 and a translation generation portion 14.

Figure 4:
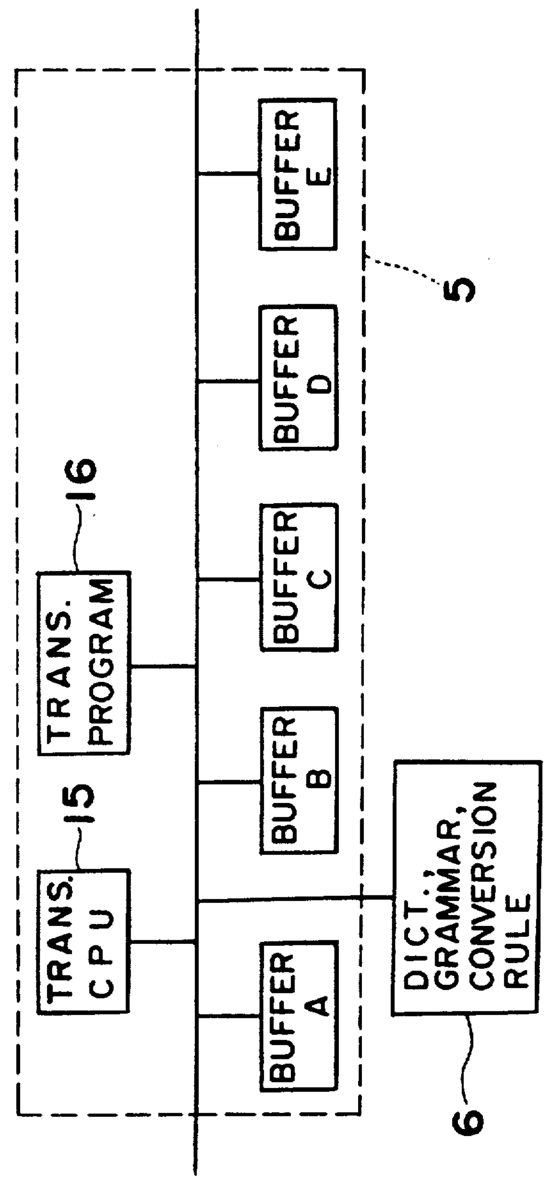
FIG. 4 is a block diagram of the translation module of FIG. 3.
Figure 5:
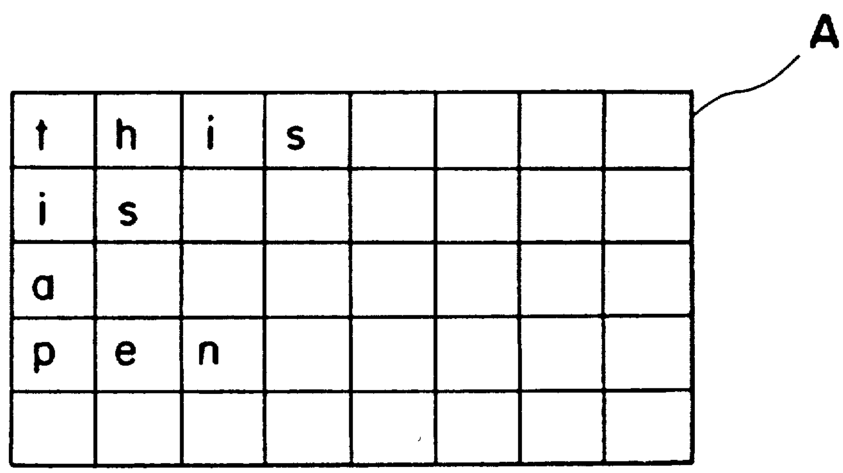
Figure 6:
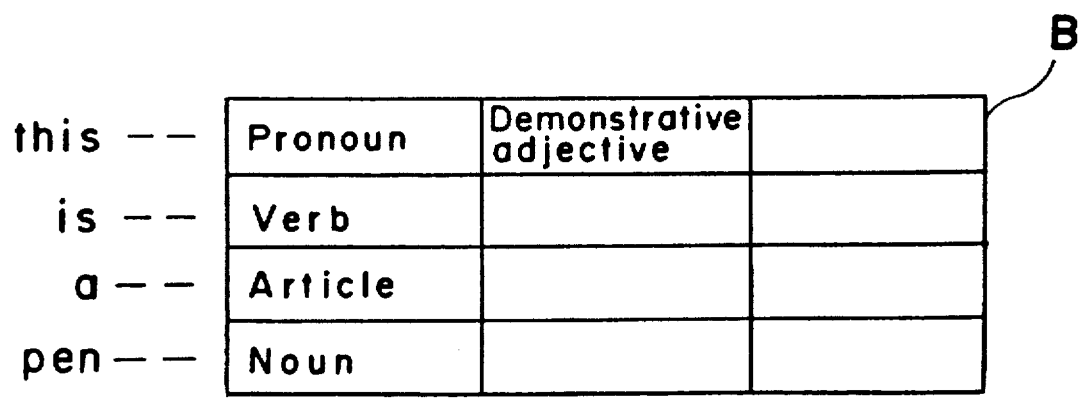

FIG. 4 is a block diagram of the translation module 5. In FIG. 4, the translation module 5 includes a translation CPU 15, a translation program 16 and buffers A to E. Meanwhile, FIGS. 5 to 9 show contents of the buffers A to E of the translation module 5 in the case where an English sentence: "This is a pen." is translated into Japanese. Hereinbelow, processes of translation from English into Japanese are described with reference to FIGS. 3 to 9. Initially, the originally read English sentence is stored in the buffer A as shown in FIG. 5. Under control of the translation CPU 15 based on the translation program 16, necessary grammatical data of each of the words of the sentence are obtained by the dictionary look-up and morphological analysis portion 11 in accordance with the original English sentence stored in the buffer A, by using the dictionary of memory 6, and are stored in the buffer B. For example, data on parts of speech of the words of the original English sentence are stored as shown in FIG. 6. The word "this" acts as a plurality of parts of speech, i.e. pronoun and demonstrative pronoun. The word "this" is determined as pronoun by the syntactic analysis portion 12. In the syntactic analysis portion 12, a structural analysis tree indicative of modificatory relations among the the words of the original English sentence is determined in accordance with the dictionary and the grammatical rules of the memory 6 as shown in FIG. 7. This structural analysis tree is determined as follows. Namely, the following rules (a) to (e) are obtained from the grammatical rules of the memory 6.

(a) A sentence comprises a subject and a predicate.
(b) The subject comprises a noun phrase.
(c) The predicate comprises a verb and a noun phrase.
(d) The noun phrase comprises a pronoun.
(e) The noun phrase comprises an article and a noun.

Based on the rules (a) to (e), the structural analysis tree is determined.

As shown in FIG. 8, in the conversion portion 13, a construction of the structural analysis tree (FIG. 7) of the inputted English sentence is converted into a construction of a Japanese sentence by using the tree structure conversion rules of the memory 6 in the same manner as the syntactic analysis portion 12. The result thus obtained, i e. an incompletely translated Japanese sentence J1: " " is stored in the buffer D. The translation generation portion 14 of FIG. 3 adds a proper particle " " (or a proper auxiliary verb) to the incompletely translated Japanese sentence J1 so as to obtain a completely- translated Japanese sentence J2: " " and stores the completely translated Japanese sentence J2 in the buffer E. The completely translated Japanese sentence J2 is outputted from the translation module 5 so as to be not only stored in the main memory 2 but also displayed at the CRT 3.

Figure 10:
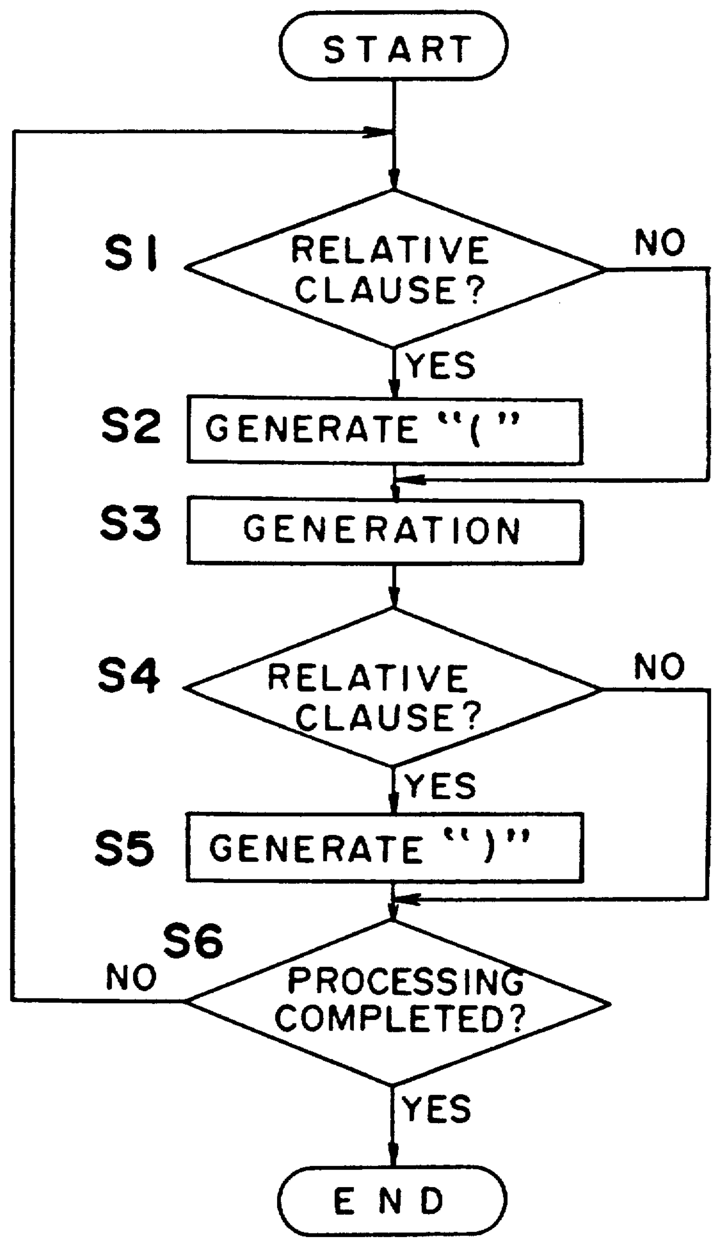
FIG. 10 is a flow chart showing a processing sequence of translation of a relative clause of nonrestrictive use by the translating apparatus of FIG. 1.

At this time, the translation generation portion 14 generates a relative clause of nonrestrictive use in parentheses "11". FIG. 10 shows a processing sequence of translation of the relative clause of nonrestrictive use by the translating apparatus of the present invention. Initially, at step S1, it is decided whether or not the construction analyzed by the syntactic analysis portion 12 includes a relative clause of nonrestrictive use. In the case of "YES" at step S1, the program flow proceeds to step S2. On the other hand, in the case of "NO" at step S1, the program flow skips step S2 to step S3. At step S2, an initial parenthesis "(" is generated. Then, at step S3, a target language of the relative clause of nonrestrictive use is generated. At step S4, it is decided whether or not the generated target language is a relative clause of nonrestrictive use. In the case of "YES" at step S4, the program flow proceeds to step S5. Meanwhile, in the case of "NO" at step S4, the program flow skips step S5 to step S6. In the case of "YES" at step S4, a final parenthesis ")" is generated at step S5 and thus, the target language of the relative clause of nonrestrictive use is generated in parentheses "(11)". At step S6, it is decided whether or not the generation processing has been completed. In the case of "NO" at step S6, the program flow returns to step S1. On the contrary, in the case of "YES" at step S6, the generation processing is terminated.

FIG. 11 shows one example of an English original and a Japanese translation which are, respectively, inputted to and outputted from the translating apparatus of the present invention. The inputted English sentence is translated into the Japanese sentence by the translating apparatus of the present invention. In this example, since the inputted English sentence includes a relative clause of nonrestrictive use: ", which is the precursor for dominance in the other fields", a Japanese translation of the relative clause of nonrestrictive use is generated in parentheses "(11)", so that the Japanese translation of the relative clause of nonrestrictive use is clarified in the translated Japanese sentence and thus, understanding of the translated Japanese sentence as a whole is facilitated.

In the translating apparatus according to this embodiment of the present invention, if check of a prepositional or indefinite phrase for modifying a verb accompanied by a comma located immediately before the phrase is performed at steps S1 and S4 of FIG. 10 in the same manner as the relative clause of nonrestrictive use, the prepositional or indefinite phrase for modifying a verb accompanied by a comma located immediately before the phrase can be independently generated in parentheses "(11)". In the present invention, it is needless to say that parentheses "(11)" can be replaced by other similar symbols such as brackets "[11]" and braces "{11}".

As will be seen from the foregoing description, the translating apparatus of the present invention includes the syntactic decision means which decides from the construction of the inputted sentence whether or not a relative clause of nonrestrictive use or a prepositional or indefinite phrase for modifying a verb accompanied by a comma located immediately before the phrase exists and the symbol generating means which generates in the translated sentence, the first and second symbols indicative of the start position and the end position of the relative clause or the prepositional or indefinite phrase when the relative clause or the prepositional or indefinite phrase exists.

Therefore, in accordance with the present invention, the relative clause of nonrestrictive use or the prepositional or indefinite phrase for modifying a verb accompanied by a comma located immediately before the phrase can be independently generated in parentheses in the translated sentence. Consequently, the relative clause of nonrestrictive use and the prepositional or indefinite phrase for modifying a verb can be clarified in the translated sentence and thus, better understanding of the translated sentence as a whole can be gained.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method of translating an input sentence of a source language into a target language comprising the steps of:
  - dividing an inputted sentence of the source language into a string of morphemes;
  - analyzing the string of morphemes and converting the string of morphemes into the target language;
  - generating a translated sentence of the target language in accordance with the converted morphemes;
  - determining in syntactic decision means if a relative clause of nonrestrictive use or a prepositional or indefinite phrase for modifying a verb, accompanied by a comma located immediately before the prepositional or indefinite phrase, exists in the string of morphemes; and
  - displaying on display means said translated sentence with first and second symbols which respectively indicate the start and end of an existing relative clause or an existing prepositional or indefinite phrase as determined by said determining step.

2. The method of translating of claim 1 in which said first and second symbols are parentheses.

3. A method of translating an input sentence of a source language into a target language comprising the steps of:
  - a) morphologically analyzing and dividing said input sentence of the source language into a string of morphemes by using a dictionary;
  - b) syntactically analyzing the string of the morphemes by using the dictionary and grammatical rules;
  - c) coverting the string of the syntactically analyzed morphemes into the target language;
  - d) generating a translated sentence of the target language in accordance with the converted morphemes;
  - e) determining whether or not a relative clause of nonrestrictive use or a prepositional or indefinite phrase for modifying a verb, accompanied by a comma located immediately before the prepositional or indefinite phrase, exists in the string of the morphemes; and
  - f) displaying on display means the translated sentence with first and second symbols indicative, respectively, of a start position and an end position of an existing relative clause or an existing prepositional or indefinite phrase as determined in step c), wherein a translation of the relative clause or the prepositional or indefinite phrase is generated so as to be inserted between the first and second symbols.

4. The method of translating as claimed in claim 3, wherein the first and second symbols are parentheses.

5. A translating apparatus comprising:

conversion means for dividing an inputted sentence of a source language into a string of morphemes, analyzing the string of morphemes, and converting the string of morphemes into a target language;

translation means for generating a translated sentence of the target language in accordance with the converted morphemes;

syntactic decision means for determining if a relative clause of nonrestrictive use or a prepositional or indefinite phrase for modifying a verb, accompanied by a comma located immediately before the prepositional or indefinite phrase, exists in the string of morphemes; and display means for displaying said translated sentence with first and second symbols which respectively indicate the start and end of an existing relative clause or an existing prepositional or indefinite phrase as determined by said syntactic decision means.

6. The translating apparatus of claim 5 in which said first and second symbols are parentheses.

7. The translating apparatus of claim 5 in which said first and second symbols are brackets.

8. The translating apparatus of claim 5 in which said first and second symbols are braces.

9. A translating apparatus comprising:

morphological analysis means for dividing an inputted sentence of a source language into a string of morphemes by using a dictionary;

syntactic analysis means for analyzing the string of the morphemes by using the dictionary and grammatical rules;

conversion means for converting the string of the syntactical analyzed morphemes into a target language;

translation generation means for generating a translated sentence of the target language in accordance with the converted morphemes;

syntactic decision means for deciding whether or not a relative clause of nonrestrictive use or a prepositional or indefinite phrase for modifying a verb, accompanied by a comma located immediately before the prepositional or indefinite phrase, exists in the string of the morphemes; and symbol generating means for generating in the translated sentence, first and second symbols indicative, respectively, of a start position and an end position of the relative clause or the prepositional or indefinite phrase found by said syntactic decision means;

wherein a translation of the relative clause or the prepositional or indefinite phrase is generated by said translation generation means so as to be inserted between the first and second symbols.

10. A translating apparatus as claimed in claim 9, wherein the first and second symbols are parentheses.

* * * * *